(12) United States Patent
Hull

(10) Patent No.: US 6,404,547 B1
(45) Date of Patent: Jun. 11, 2002

(54) SEMI-ACTIVE FOCUS AND THERMAL COMPENSATION OF A CENTRALLY-OBSCURED REFLECTIVE TELESCOPE

(75) Inventor: David A. Hull, Manhattan Beach, CA (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 09/516,798

(22) Filed: Mar. 1, 2000

(51) Int. Cl.⁷ .................. G02B 23/00; G02B 17/00; G02B 7/02; G02B 5/10
(52) U.S. Cl. .................. 359/399; 359/365; 359/366; 359/820; 359/859
(58) Field of Search .................. 359/399, 364–366, 359/820, 850, 853, 857–859, 871; 248/901; 343/704; 356/138, 139.04, 392

(56) References Cited

U.S. PATENT DOCUMENTS

| | | |
|---|---|---|
| 4,116,537 A | 9/1978 | Dilworth |
| 4,471,448 A | 9/1984 | Williams |
| 5,383,168 A * | 1/1995 | O'Brien et al. |
| 5,600,491 A | 2/1997 | Hull et al. |

* cited by examiner

Primary Examiner—Cassandra Spyrou
Assistant Examiner—Jennifer Winstedt
(74) Attorney, Agent, or Firm—Colin M. Raufer; Leonard A. Alkov; Glenn H. Lenzen, Jr.

(57) ABSTRACT

A centrally-obscured reflective telescope having a semi-active focus and thermal compensation system. The telescope has a housing having an input window, a primary mirror, a secondary mirror suspended between the input window and the primary mirror by support struts, an optional tertiary mirror, and an optional fold mirror. The system includes one or more heating elements respectively disposed on each of the support struts. A first temperature sensor (disposed on the primary mirror) generates a reference temperature, a second temperature sensor is disposed on the secondary mirror, and one or more third temperature sensors are disposed on each of the support struts. A temperature compensation controller is coupled to the heating elements and temperature sensors and controls the heat output of the plurality of heating elements to heat the support struts and control the position of the secondary mirror relative to the primary mirror.

19 Claims, 4 Drawing Sheets

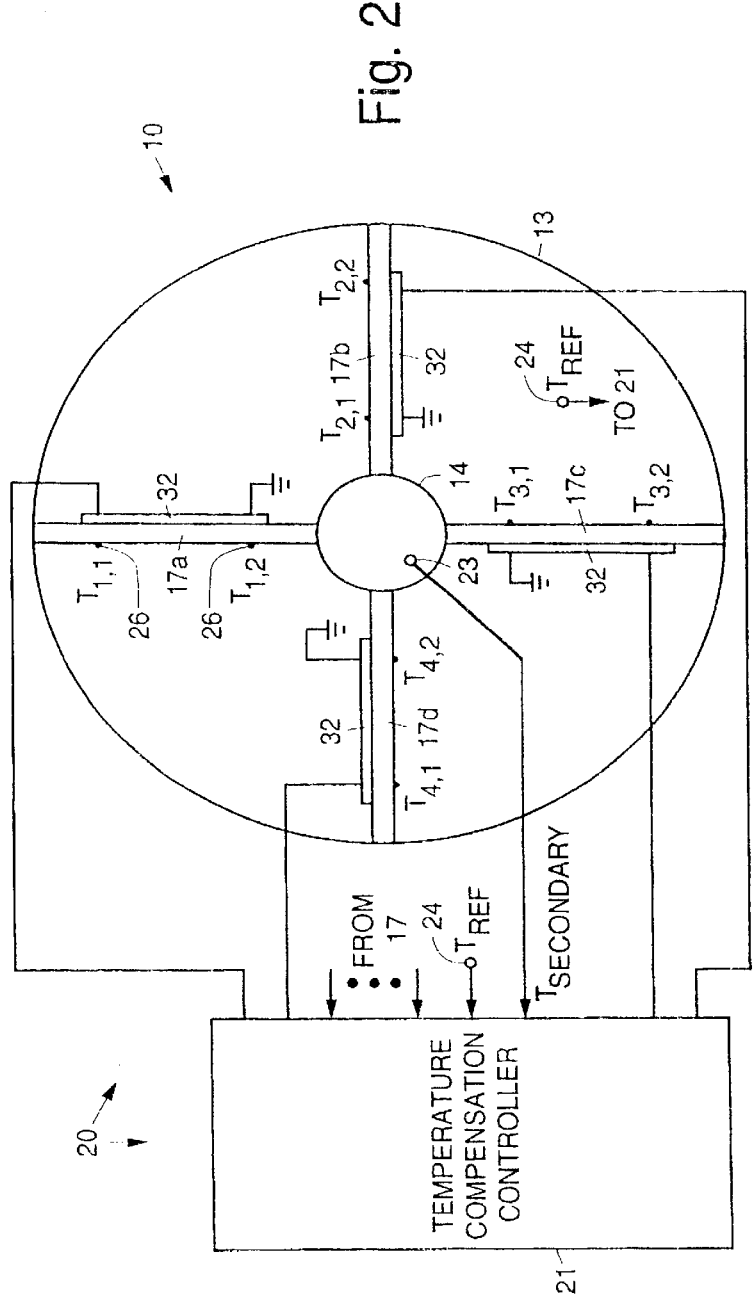
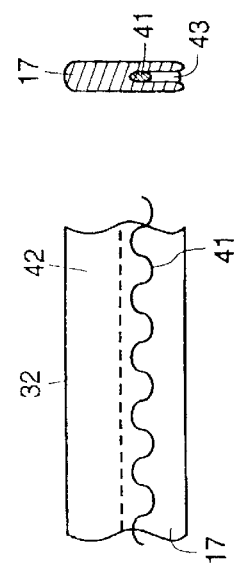
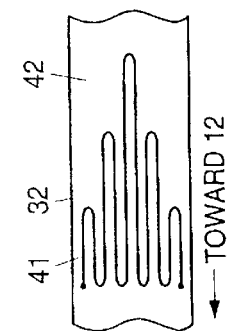

SEMI-ACTIVE FOCUS AND THERMAL COMPENSATION OF A CENTRALLY-OBSCURED REFLECTIVE TELESCOPE

BACKGROUND

The present invention relates generally to centrally-obscured reflective telescopes, and more particularly, to such as a centrally-obscured reflective telescope having a semi-active focus and thermal compensation system that also may be used for boresight correction (line-of-sight control).

A centrally-obscured reflective telescope, such as a three mirror anastigmat telescope, for example, includes a primary mirror, a secondary mirror, and a tertiary mirror. The telescope is generally paired with focusing optics or an imager that focuses an image produced by the telescope onto a detector. The telescope may be protected by a window located in object space. The secondary mirror is suspended between the window and the primary mirror by means of a plurality of support struts. The window is exposed to external temperatures and there is a temperature gradient between the exterior of the window and the primary mirror.

The three mirror anastigmat telescope provides optimum performance only within a narrow isothermal range. Many applications require the secondary mirror to be located near the window where external temperatures are extreme (high altitude in aircraft, for example), and the cavity temperature must be controlled, resulting in a large thermal gradient near the window. To minimize system and window size, the secondary mirror is generally located close to the window, and is thus within this gradient area. Techniques used to heat the window or otherwise minimize the temperature gradient take substantial power, cause gimbal disturbances due to airflow, and the like. Furthermore, these techniques do not eliminate asymmetric temperatures if the relative angle of the telescope with respect to the window is not constant (gimbal pointing). This will cause boresight shift.

The problem is that the telescope must be maintained isothermal in order to remain in focus. In particular, in order for the telescope to remain in focus, the relative curvatures of the primary and secondary mirrors must be maintained as well as the separation between the primary and secondary mirrors. Due to a difficult thermal environment and local power dissipation, this has not been possible using external cavity temperature control.

One prior approach to compensate for temperature variations involved the use of a mechanical drive system that displaces the focal plane. This approach is difficult to align initially, and is susceptible to shifts. The primary issue is that movement of the focal plane, or primary and secondary mirrors along the optical axis by as little as fifty-millionths of an inch will result in defocusing of the telescope. Actuator drives, position sensors and servo controls are required. Mechanical elements are degraded by dirt, temperature variations, shock and vibration, corrosion, lubricant degradation, calibration drift with temperature, hysteresis and friction. Furthermore, there may be optical prescription errors, and the like, that cannot be corrected by such mechanical drive system. These effects make it almost impossible to control the relative positions of the focal plane, primary and secondary mirrors with sufficient accuracy to focus the telescope.

It would therefore be an advantage to have an improved centrally-obscured reflective telescope that embodies a focus and thermal compensation that improves upon conventional approaches. Accordingly, it is an objective of the present invention to provide for an improved centrally-obscured reflective telescope having a semi-active focus and thermal compensation system. It is a further objective of the present invention to provide for an improved centrally-obscured reflective telescope having a semi-active focus and thermal compensation system that may be used for boresight correction (line-of-sight control).

SUMMARY OF THE INVENTION

To meet the above and other objectives, the present invention provides for a centrally-obscured reflective telescope, such as a three mirror anastigmat telescope, for example, that employs a semi-active focus and thermal compensation system. An exemplary three mirror anastigmat telescope comprises an insulated housing having a cavity and an input window. The telescope also comprises a primary mirror, a secondary mirror, and a tertiary mirror. The tertiary mirror is not required for all embodiments of the centrally-obscured reflective telescope. The secondary mirror is suspended between the input window and the primary mirror by means of a plurality of support struts. A cylindrical housing or barrel has the support struts secured to one end thereof and is secured to the primary mirror at the other end. The telescope is generally mated to focussing optics, such as an imager. A fold mirror may be used to reflect light from the secondary mirror onto the tertiary mirror which couples the light to the focussing optics or imager. A cavity heater may be provided in the cavity for heating the interior of the cavity.

The semi-active focus and thermal compensation system comprises a temperature compensation controller that is coupled to heating elements disposed on various components of the telescope. The temperature compensation controller is coupled to a temperature sensor disposed on each of the support struts, to a temperature sensor disposed on the secondary mirror, to a temperature sensor on disposed the primary mirror, and to a plurality of temperature sensors disposed around the cylindrical housing or barrel. The temperature sensors may comprise thermistors, for example. In general, it is desirable to have the temperature sensor on each support strut aligned with temperature sensors on the cylindrical housing or barrel.

As was mentioned in the Background section, to keep the telescope in focus, the relative curvatures of the primary and secondary mirrors must be maintained and the separation between the primary and secondary mirrors must be held constant. The semi-active focus and thermal compensation system senses temperatures of the support struts, the barrel, and the primary and secondary mirrors using the temperature sensors. The primary mirror is used as a reference, although another component may be selected.

The barrel and the support struts are selectively heated by the heating elements under control of the temperature compensation controller to control their relative lengths which in turn controls the position of the secondary mirror relative to the primary mirror and hence the focus and boresight of the telescope using servo-type balance. The secondary mirror is selectively heated to control its curvature relative to the primary mirror. These temperature control actions maintain the relative curvatures of the primary and secondary mirrors and the separation between the primary and secondary mirrors relatively constant in order to keep the telescope in focus.

The heating elements are tailored to expected gradients and are shielded from the optical path of the telescope. The temperature compensation controller provides closed loop feedback control of the strut, barrel and mirror temperatures, and thus, focus and thermal characteristics of the telescope. The temperature compensation controller may control the heating elements in an analog (hardwired) fashion, or the heaters may be software controlled, depending upon requirements.

The heating elements attached to the support struts, barrel and secondary mirror athermalize the telescope, provide focus control, and mitigate boresight drift. This is accomplished by multipoint temperature sensing and proportional heater power control using the temperature compensation controller. The semi-active focus and thermal compensation system may be operated in a balance mode, providing only athermalization, or active boresight correction and focus control may be provided by the controller.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 2 (illustrates details of the semi-active focus and thermal compensation system used in the centrally-obscured reflective telescope shown in FIG. 1;

FIG. 3 shows a plan view of an exemplary surface heating element that may be employed in the semi-active focus and thermal compensation system;

FIGS. 4a and 4b show plan and sectional views of an exemplary embedded heating element that may be employed in the semi-active focus and thermal compensation system;

DETAILED DESCRIPTION

Figure 1:
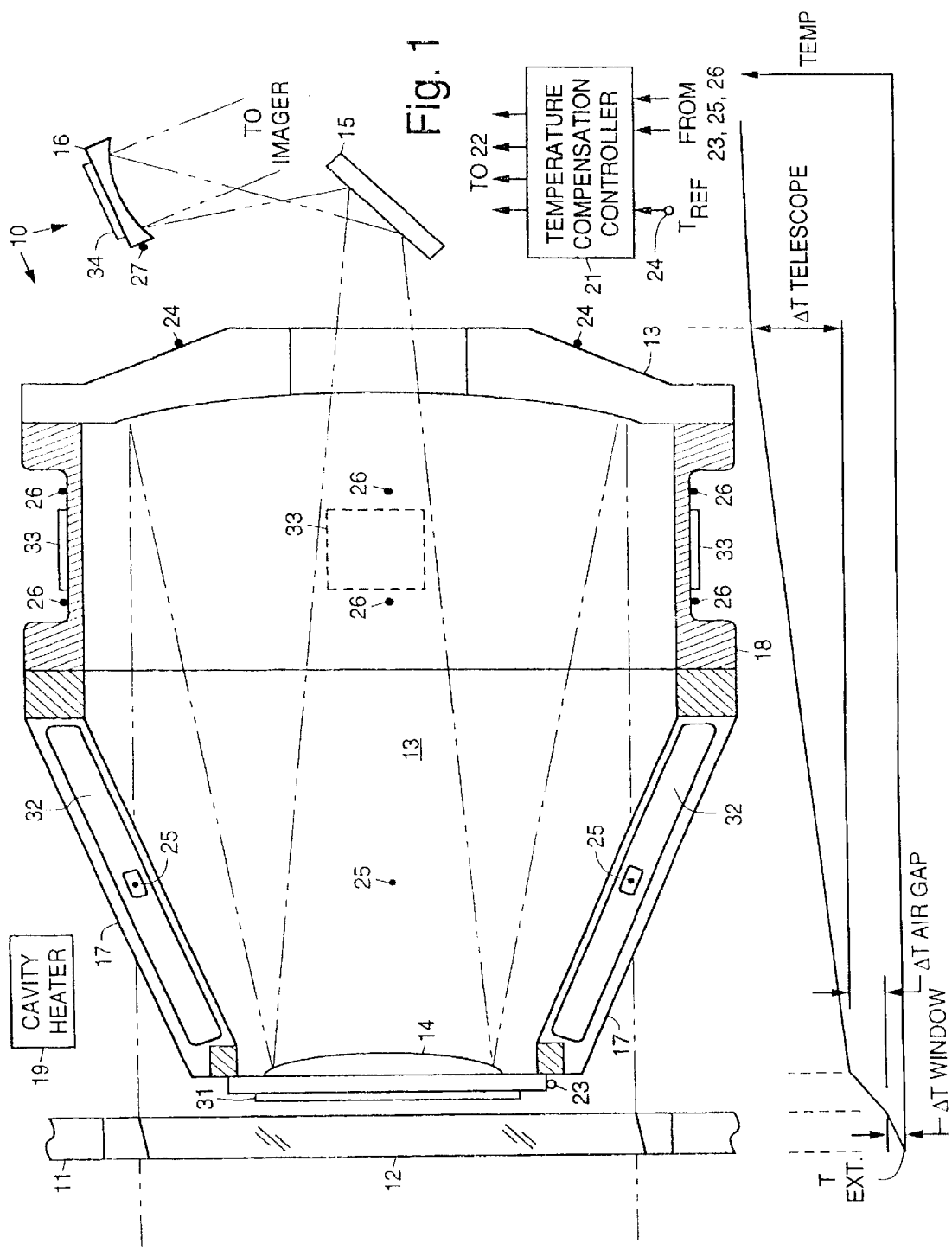
FIG. 1 illustrates a partially cutaway side view of a reduced-to-practice embodiment centrally-obscured reflective telescope employing an exemplary embodiment of a semi-active focus and thermal compensation system in accordance with the principles of the present invention.
Figure 1A:
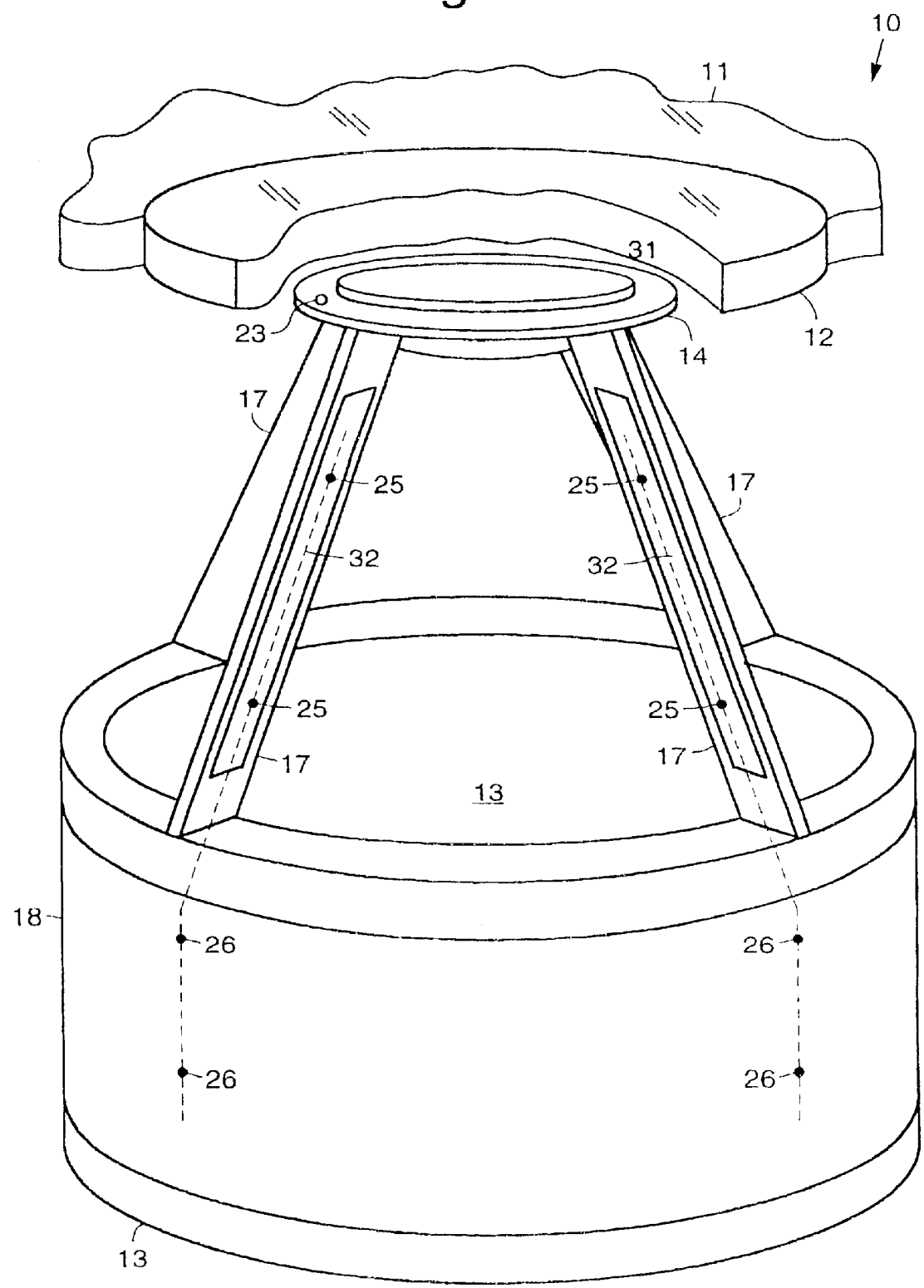
FIG. 1a is a partially cutaway perspective view of the centrally-obscured reflective telescope shown in FIG. 1.

Referring to the drawing figures, FIG. 1 illustrates a partial cutaway side view of an exemplary centrally-obscured reflective telescope 10 comprising an exemplary embodiment of a semi-active focus and thermal compensation system 20 in accordance with the principles of the present invention. FIG. 1a is a partially cutaway perspective view of the exemplary centrally-obscured reflective telescope 10 shown in FIG. 1. FIG. 2 shows a front view of the centrally-obscured reflective telescope 10 shown in FIG. 1 and illustrates details of the semi-active focus and thermal compensation system 20.

The exemplary centrally-obscured reflective telescope 10 is illustrated as a three mirror anastigmat telescope 10. Although the present invention is shown and described with reference to a centrally-obscured reflective telescope 10 having a Cassegrain configuration, it is to be understood that other configurations may be used.

The exemplary telescope 10 comprises an telescope housing 11 (a portion of which is shown) which may be insulated, having an internal cavity 12 and an input window 13. The telescope 10 comprises three powered mirrors including a primary mirror 13, a secondary mirror 14, an optional tertiary mirror 16, and includes an optional flat fold mirror 15. An inner housing 18 or barrel 18 has the support struts 17 secured to one end thereof and is secured to the primary mirror 13 at the other end thereof. The secondary mirror 14 is suspended between the input window 11 and the primary mirror 13 by means of a plurality of support struts 17. The above-mentioned optical components are disposed within the cavity 13 of the telescope housing 11 or on an optical bench (not shown). A cavity heater 19 may be provided in the cavity 13 for heating the interior of the cavity 13.

The telescope 10 is typically mated to focussing optics, such as an imager (generally shown). A fold mirror is used to improve packaging of the telescope 10 and to reflect light from the secondary mirror 14 onto the tertiary mirror 16 which couples the light to the focussing optics or imager.

The semi-active focus and thermal compensation system 20 comprises a temperature compensation controller 21 that is coupled to a plurality of temperature sensors and heating elements that are respectively disposed on various components of the telescope 10. One or more first temperature sensors 24 are disposed on the primary mirror 13 that generate a reference temperature ($T_{REF}$), a second temperature sensor 23 is disposed on the secondary mirror 14, and one or more third temperature sensors 25 are disposed on the support struts 17. A plurality of fourth temperature sensors 26 may be disposed around the periphery of the barrel 18, that are typically located in respective quadrants thereof. A temperature sensor 27 may also be disposed on the tertiary mirror 16. The temperature sensors 23, 24, 25, 26, 27 may comprise thermistors, for example. In general, it is preferable to have the third temperature sensor 25 on each support strut 17 aligned with temperature sensors on the barrel 18.

A secondary mirror heating element 31 may be disposed on the secondary mirror 14. The secondary mirror heating element 31 is used to control the curvature of the secondary mirror 14. One or more strut heating elements 32 are disposed on each of the support struts 17. The strut heating elements 32 are is used to control the relative lengths of the respective support struts 17. A plurality of strip heating elements 33 may be disposed around the periphery of the barrel 18, that are typically located in respective quadrants thereof. The cavity heater 19 may be used to heat the interior of the cavity 13, including the barrel 18, instead of the plurality of strip heating elements 33. The various heating elements may be secured to the their respective components using an adhesive film, for example.

In a preferred embodiment, the temperature sensors 23–27 are located as follows. The temperature sensors 23, 24, 27 are disposed on each of the powered mirrors 13, 14, 16 (primary mirror 13, secondary mirror 14, tertiary mirror 16). The curvature of the powered mirrors 13, 14, 16 are sensitive to temperature, and can be corrected by mathematically predicting curvature as a function of temperature and controlling the temperatures of the respective 13, 14, 16. The second temperature sensors 24 are disposed on the primary mirror 13 and generate the reference temperature ($T_{REF}$), The temperature sensors 23–27 are mapped into a focus algorithm employed in the controller 21 using analysis of the growth of the telescope 10 due to temperature gradients. Active corrections are input from these temperature sensors 23–27.

In the preferred embodiment, the cavity heater 19 is used to heat the interior of the cavity 13 and the barrel 18.

Therefore, the plurality of strip heating elements 33 on the barrel 18 are not used. The fourth temperature sensors 26 are thus disposed on an unheated structure (i.e., the barrel 18). For example. in a reduced to practice embodiment of the system 20, eight or more fourth temperature sensors 26 are disposed on the barrel 18.

The controller 21 of the semi-active focus and thermal compensation system 20 senses temperatures of the support struts 17, the barrel 18, primary mirror 13, the secondary mirror 14, and optionally the tertiary mirror 16 using the respective temperature sensors 25, 26, 23, 24, 27. The support struts 17 that support the secondary mirror 14 are heated by the strut heating elements 32 under control of the temperature compensation controller 21 to control the position (focus and boresight) of the secondary mirror 14 using servo-type control. The strut heating elements 32 are tailored to expected temperature gradients and are shielded from the optical path of the telescope 10. The controller 21 provides closed loop feedback control of the strut, barrel and mirror temperatures, and thus the focus and thermal characteristics of the telescope 10. The controller 21 may control the strut heating elements 32, strip heating elements 33 and mirror heating elements 31, 34 in an analog (hardwired) fashion. Alternatively, the heating elements 31–34 may be software controlled.

The temperatures sensed by the temperature sensors 23–27 are instantaneous and autonomous in that, as the system 20 operates, it is subject to thermal transient such as turn-on, solar load, active components mounted in close proximity, local air temperature, and the like. If the controller 21 is operating with a given sample frequency, the struts 17 can be continuously commanded to refocus and the curvature of the secondary mirror 14 can be adjusted to provide the correct curvature.

Two temperature sensors 24 were used on the primary mirror 13 of a reduced-to-practice telescope 10. The primary mirror 13 has the highest sensitivity (defocus/°C.) and this is used as the first correction term ($T_{REF}$) in the calculation performed by the algorithm. The outputs of the two sensors 24 were averaged.

In developing the telescope 10, the secondary mirror heating element 31 was installed on the secondary mirror 14. However, it was determined that this heating element 31 was not required. Notwithstanding this, such a heating element 31 may be used in certain applications, to provide additional correction term for the focus algorithm.

It is to be understood that the reduced-to-practice embodiment of the telescope 10 shown in FIG. 1 is afocal (not focused). An imager is used to focus light to a point or focal plane. Thus, the output beam from the telescope 10 has parallel limit rays as shown in FIG. 1.

FIG. 3 shows a plan view of a first exemplary heating element 32 that may be employed in the semi-active focus and thermal compensation system 20. The first heating element 32 is a thermo-foil type heating element 32. The thermo-foil type heating element 32 comprises a foil filament 41 that is disposed on a dielectric substrate 42. One end of the foil filament 41 is coupled to a heater output of the temperature compensation controller 21 while the other end is coupled to ground.

FIGS. 4a and 4b show plan and sectional views of a second exemplary heating element 32 that may be employed in the semi-active focus and thermal compensation system 20. The second heating element 32 may be an embedded type heating element 32. The embedded type heating element 32 comprises a filament 41 that is embedded within the support strut 17. The filament 41 may be disposed in a slot, for example in the support strut 17 which is filled with a filler material 43 to encapsulate the filament 41. The filler material 43 may comprise a flexible epoxy-based compound, for example. One end of the filament 41 is coupled to a heater output of the temperature compensation controller 21 while the other end is coupled to ground.

The strut heating elements 32 attached to the support struts 17 for the secondary mirror 14 athermalize the telescope 10, provide focus control, and mitigate boresight drift. This is accomplished by multipoint temperature sensing of the heated elements (support stouts 17) and the secondary mirror 14 and proportional heater power control provided by the temperature compensation controller 21.

The semi-active focus and thermal compensation system 20 may be operated in a balanced mode, providing only athermalization. Alternatively active boresight correction and focus control may be provided by the controller 21. This will be discussed with reference to FIGS. 5–7. The illustrations in FIGS. 5–7 are not drawn to scale.

Figure 5:
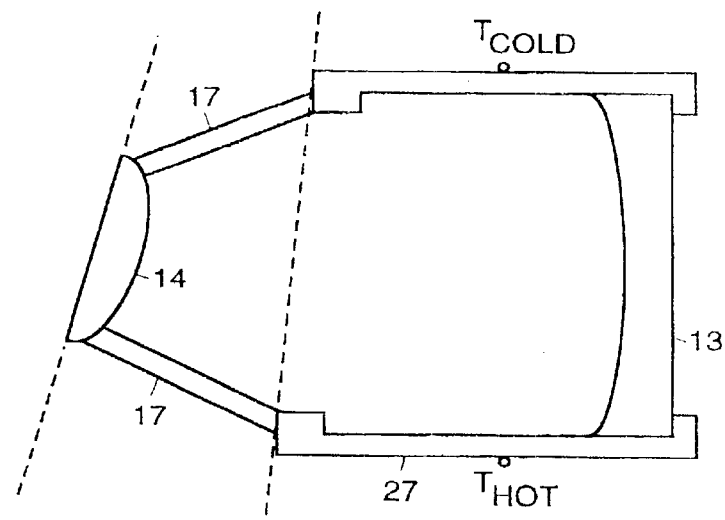
FIG. 5 illustrates an uncorrected telescope housing gradient obtained without using the present invention.

FIG. 5 illustrates an uncorrected telescope housing gradient obtained without using the present invention. The secondary mirror 14 is coupled by way of struts 17 that are unsensed. As a consequence, the focus and boresight of the telescope 10 are uncompensated and the image produced by the telescope 10 will not be focused at the desired location.

Figure 6:
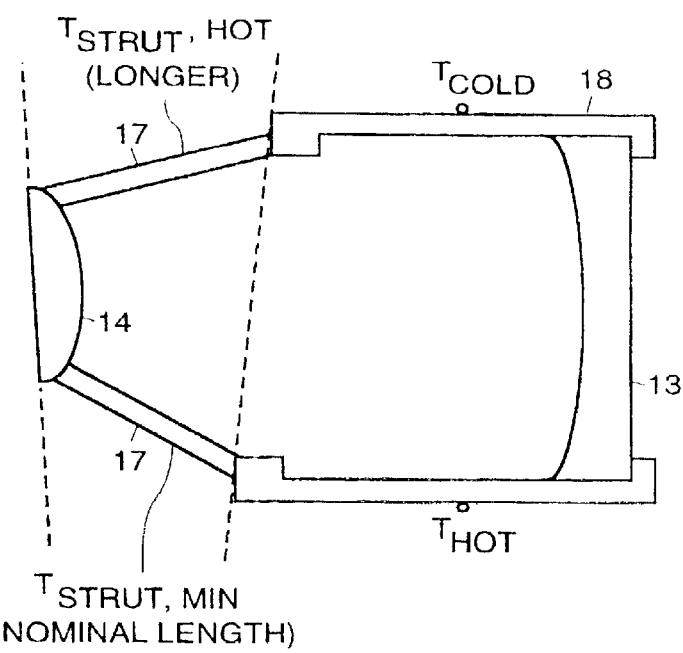
FIG. 6 illustrates a corrected telescope housing gradient obtained using the present invention.

FIG. 6 illustrates a corrected telescope housing gradient obtained using the present invention. By sensing the temperatures of the struts 17 and mirrors 13, 14, 16, the controller 21 can adjust the respective temperatures provided by the heating elements 32 to change their respective lengths and therefore maintain focus and boresight of the telescope 10.

Figure 7:
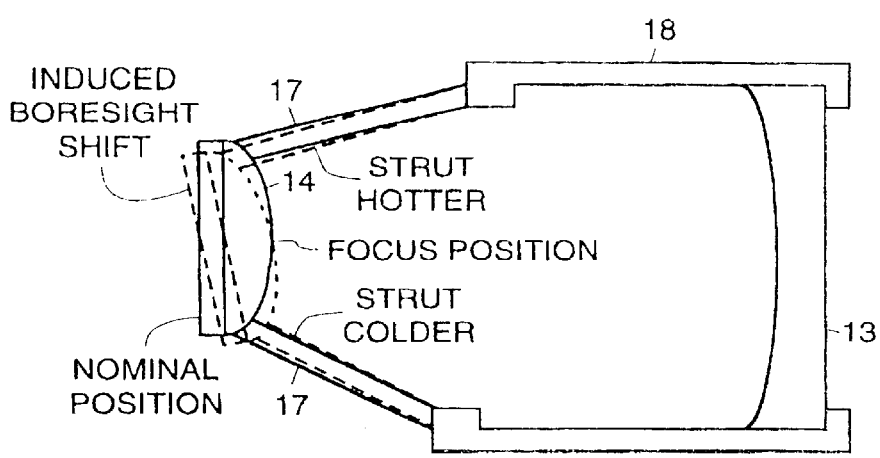
FIG. 7 illustrates boresight correction achieved using the present invention.

FIG. 7 illustrates boresight correction achieved using the present invention. The nominal positions of the struts 17 and secondary mirror 14 are shown in solid lines. The adjusted (compensated) positions of the struts 17 and secondary mirror 14 are shown in dashed lines. By using the controller 21 to adjust the respective temperatures provided by the heating elements 32 coupled to the struts 17, for example, the respective lengths of the struts 17 are controlled to correct the boresight of the telescope 10.

One benefit of using the present invention is that materials having different coefficients of thermal expansion may be used. This is desirable from a manufacturing producibility an cost standpoint. For example, the mirrors 13, 14, 16 used in the reduced-to-practice embodiment of the telescope 10 were 6061-T651 aluminum. The secondary support struts 17 and barrel 18 were made of A356 or A357 cast aluminum.

If all of the components of the telescope 10 were aligned and focused at 68° F., and if the coefficients of thermal expansion of each component matched all of the other components, and if the entire telescope 10 remained isothermal, then it would always be in focus. This would also establish the initial boresight. Most practical systems, however, are made from the most suitable material for that component. Therefore, the coefficients of thermal expansion are typically not identical.

Furthermore, most systems experience both thermal gradients and thermal transients. Even in scientific instruments (astronomy) these are a problem. In military and commercial systems, which are usually tightly packaged and weight critical, the thermal problems may be severe.

If the struts 17 are used to correct a thermal gradient in the telescope 10, they simultaneously correct both focus and boresight as was discussed with reference to FIGS. 5–7. For practical purposes, the struts 17 need to be heated slightly above the temperature of the remaining components. If one side of the struts 17 are allowed to cool and the other side is heated, a boresight shift is induced such as is illustrated in FIG. 7. Thus, by applying temperature commands in an appropriate way, full X/Y tilting of the secondary mirror 14 may be achieved. This may be done open loop (fixed offsets in the software command, for example) or using feedback from another alignment references, providing an autoalignment system.

Other features may be included in order to enhance the semi-active focus system 20 provided by the present invention. It may be desirable to alter the heat transfer characteristics of the telescope 10. Typical methods include adding fin area to the barrel 18, for example, to more closely couple it to the local air temperature, or to add thermal insulation to decouple the component from the air (such as on the secondary mirror 14, for example). Also, active heating of the barrel 18 may be performed. The addition of strip heaters 33 in each quadrants of the barrel 18 may be done, although it was not necessary in the reduced-to-practice embodiment of the telescope 10 shown in FIG. 1.

It is to be understood that the reduced-to-practice embodiment of the telescope 10 shown in FIG. 1 is afocal (not focused). An imager is used to focus light to a point or focal plane. Thus, the output beam from the telescope 10 has parallel limit rays as shown in FIG. 1.

The structure of the semi-active focus and thermal compensation system 20 eliminates the need for a mechanical focus system, which is more complex, expensive, and less reliable. The semi-active focus and thermal compensation system 20 also takes very little volume or weight on a gimbal (not shown) on which the telescope 10 may be disposed. The semi-active focus and thermal compensation system 20 may he used in any three mirror anastigmat telescope or in any telescope having a similar configuration.

The semi-active focus and thermal compensation system 20 directly addresses the fundamental problem of non-isothermal optics in the three mirror anastigmat telescope 10, rather than correcting the effects of the problem. The simple implementation embodied in the semi-active focus and thermal compensation system 20 may be used to provide active boresight and focus in addition to isothermal control.

The semi-active focus and thermal compensation system 20 uses simply fabricated, low cost parts. The semi-active focus and thermal compensation system 20 uses electrical control, and it is much easier to optimize in-situ, resulting in lower development cost and risk. In high performance electro-optical imaging sensors, such as those developed by the assignee of the present invention; for example, a processor may already exist, which may be programmed to implement the control functions of the temperature compensation controller 21, thus adding capability without additional cost. The components used in the semi-active focus and thermal compensation system 20 are also readily available and are reliable, which reduces cost and risk.

The semi-active focus and thermal compensation system 20 is mechanically rigid and provides an optimal structure since no sliding mechanisms or linkages are used. There is no loss of structural stiffness of the telescope 10 when using the semi-active focus and thermal compensation system 20.

Thus, an improved centrally-obscured reflective telescope having a semi-active focus and thermal compensation system has been disclosed. It is to be understood that the described embodiments are merely illustrative of some of the many specific embodiments which represent applications of the principles of the present invention. Clearly, numerous and other arrangements can be readily devised by those skilled in the art without departing from the scope of the invention.

What is claimed is:

1. A centrally-obscured reflective telescope comprising:
   a telescope housing having an input window;
   an inner housing;
   a primary mirror attached to a first end of the inner housing;
   a secondary mirror attached to a second end of the inner housing by a plurality of support struts that suspend the secondary mirror between the input window and the primary mirror; and
   a semi-active focus and thermal compensation system comprising:
      a heating element disposed on each of the support struts;
      a first temperature sensor that generates a reference temperature;
      a second temperature sensor disposed on the secondary mirror;
      a temperature sensor disposed on each of the support struts; and
      a temperature compensation controller coupled to each heating element and to the temperature sensors that senses the reference temperature and the temperatures of the support struts and secondary mirror and controls the heat output of each heating element to selectively heat the support struts to control the position of the secondary mirror relative to the primary mirror.

2. The telescope recited in claim 1 further comprising a secondary mirror heating element (31) disposed on the secondary mirror that is coupled to the temperature compensation controller, and wherein the temperature compensation controller controls the heat output of the secondary mirror heating element to adjust the curvature of the secondary mirror to keep the telescope in focus.

3. The telescope recited in claim 1 wherein the temperature sensors comprise thermistors.

4. The telescope recited in claim 1 wherein the heating elements are tailored to expected temperature gradients experienced by the telescope.

5. The telescope recited in claim 1 wherein the heating elements are shielded from the optical path of the telescope.

6. The telescope recited in claim 1 wherein the temperature compensation controller controls the heating elements in an analog fashion.

7. The telescope recited in claim 1 wherein the temperature compensation controller controls the heating elements using a software algorithm.

8. The telescope recited in claim 1 wherein the heating elements comprise thermo-foil heating elements.

9. The telescope recited in claim 1 wherein the heating elements comprise embedded heating elements.

10. The telescope recited in claim 1 further comprising a tertiary mirror and a fold mirror disposed between the secondary mirror the tertiary mirror.

11. A semi-active focus and thermal compensation system for use with a centrally-obscured reflective telescope comprising a housing having an input window, a primary mirror, and a secondary mirror suspended between the input window and the primary mirror by a plurality of support struts, the system comprising:
   a heating element disposed on each of the support struts;

a first temperature sensor that generates a reference temperature;

a second temperature sensor disposed on the secondary mirror;

a plurality of third temperature sensors, one disposed on each of the support struts; and a temperature compensation controller coupled to the heating elements and the temperature sensors that senses the reference temperature and the temperatures of the support struts and secondary mirror and controls the heat output of the plurality of heating elements to selectively heat the support struts to control the position of the secondary mirror relative to the primary mirror.

12. The system recited in claim 11 wherein the telescope further comprises a secondary mirror heating element (31) disposed on the secondary mirror that is coupled to the temperature compensation controller, and wherein the temperature compensation controller controls the heat output of the secondary mirror heating element to adjust the curvature of the secondary mirror to keep the telescope in focus.

13. The system recited in claim 11 wherein the temperature compensation controller is hardwired to the heating elements and controls the heating elements in an analog fashion.

14. The system recited in claim 11 wherein the heating elements are tailored to expected temperature gradients experienced by the telescope.

15. The system recited in claim 11 wherein the heating elements are shielded from the optical path of the telescope.

16. The system recited in claim 11 wherein the temperature sensors comprise thermistors.

17. The system recited in claim 11 wherein the temperature compensation controller controls the heating elements using a software algorithm.

18. The system recited in claim 11 wherein the heating elements comprise thermo-foil heating elements.

19. The system recited in claim 11 wherein the heating elements comprise embedded heating elements.

* * * * *